(12) United States Patent
Randhawa

(10) Patent No.: US 7,503,765 B2
(45) Date of Patent: *Mar. 17, 2009

(54) EDUCATIONAL GAME

(76) Inventor: Kuldip Randhawa, 10929 140th St., Surrey, BC (CA) V3R 3G3

( * ) Notice: Subject to any disclaimer, the term of this patent is extended or adjusted under 35 U.S.C. 154(b) by 0 days.

This patent is subject to a terminal disclaimer.

(21) Appl. No.: 11/423,415

(22) Filed: Jun. 9, 2006

(65) Prior Publication Data

US 2007/0020590 A1 Jan. 25, 2007

Related U.S. Application Data

(63) Continuation of application No. 10/484,235, filed as application No. PCT/CA02/01113 on Jul. 17, 2002, now Pat. No. 7,086,865.

(60) Provisional application No. 60/305,609, filed on Jul. 17, 2001.

(51) Int. Cl.
    *G09B 19/22* (2006.01)
(52) U.S. Cl. ...................................... 434/129
(58) Field of Classification Search ................ 434/188, 434/128, 129, 130, 167, 172, 209; 273/287–288, 273/296, 299–302, 308–309, 148 A, 239, 273/236, 274, 280, 281
    See application file for complete search history.

(56) References Cited

U.S. PATENT DOCUMENTS

| | | | | |
|---|---|---|---|---|
| 3,617,063 A * | 11/1971 | Dyer et al. ................... 273/239 |
| 3,685,831 A * | 8/1972 | Walss ..................... 273/142 JB |
| 4,079,945 A * | 3/1978 | Brass .......................... 273/239 |
| 4,470,821 A | 9/1984 | LeCapelain |
| 4,488,720 A * | 12/1984 | Cook .......................... 273/239 |
| 4,624,464 A * | 11/1986 | Propsom ..................... 273/280 |
| 4,682,777 A * | 7/1987 | Wood .......................... 273/243 |
| 4,801,149 A | 1/1989 | Alnafissa |
| 4,889,344 A | 12/1989 | Zimba |
| 5,145,181 A * | 9/1992 | Welman et al. ............. 273/237 |
| 5,244,391 A | 9/1993 | Bryant |
| 5,280,914 A | 1/1994 | Selby et al. |
| 5,415,411 A * | 5/1995 | Peterson ..................... 273/237 |
| 5,580,252 A * | 12/1996 | McCrady .................... 434/128 |
| 5,738,354 A | 4/1998 | Easley |
| 5,810,355 A | 9/1998 | Trilli |
| 5,836,587 A * | 11/1998 | Druce et al. ................ 273/296 |
| 5,868,390 A * | 2/1999 | Ripley ........................ 273/287 |

(Continued)

*Primary Examiner*—Kurt Fernstrom
(74) *Attorney, Agent, or Firm*—Davis Wright Tremaine LLP; David H. Deits; Heather M. Colburn

(57) ABSTRACT

An educational game is provided, comprising a plurality of qualification cards least one subject, said qualification cards having a qualification question and a corresponding qualification answer; and a plurality of preparatory cards for at least one subject, said preparatory cards having a preparatory question and a corresponding preparatory answer wherein a player of the game, when presented with said qualification question and on providing said qualification answer, is presented with said preparatory question and on providing said preparatory answer, receives a score. A method for playing an educational game is provided, wherein a player's turn comprises receiving a qualification question; providing a qualification response to said qualification question; if said qualification response to said qualification is the corresponding answer to said qualification question, receiving a preparatory question; providing a preparatory response to said preparatory question; and if said preparatory response is the corresponding answer to said preparatory question, receiving a score.

4 Claims, 3 Drawing Sheets

U.S. PATENT DOCUMENTS 6,419,229 B1 * 7/2002 Whittington et al. ........ 273/245
6,648,648 B1    11/2003 O'Connell
6,676,414 B1    1/2004 MacHendrie et al.
6,884,076 B2    4/2005 Clark et al.

* cited by examiner

SECTION Y-Y

SECTION X-X

EDUCATIONAL GAME

CROSS REFERENCE TO RELATED APPLICATION

This application is a continuation application of U.S. Ser. No. 10/484,235 filed Jul. 30, 2004 which is the National Stage of PCT/CA02/01113 filed Jul. 17, 2002 which claims a priority benefit of provisional application Ser. No. 60/305,609 filed Jul. 17, 2001.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent Office file or records but otherwise reserves all copyright rights whatsoever.

TECHNICAL FIELD

This invention relates generally to a game, and more particularly, an educational board game adapted to accommodate the differing skill levels and age of its players.

BACKGROUND

In a society that values education, tools to assist in learning are in demand for all age groups in all subject areas. For example, elementary school children use pictorial workbooks to learn basic mathematics. Tutoring programs are offered to high school students who may need extra help in chemistry. Preparatory courses and practice exam workbooks are available for university students preparing for qualification examinations to enroll in postgraduate programs. Regardless of age, skill level, and subject area, an effective method to learn is to make the learning process enjoyable and fun.

A number of educational games disclosed in the art target players of a specific age group. Such games are based on the limited scope of knowledge of players within the specific age group and therefore limit the extent to which skills may be developed in any given subject area. Furthermore, because most educational games in the art are so limited, simultaneous participation by players of different age and skill levels is not possible. For example, younger individuals in a group of players may feel left out when other older individuals are playing because the game is too difficult for them to play.

Other board games in the art utilize a game board and related parts for use in playing the game. The use of such board and related parts may make it difficult for a group of individuals to play because the game board often has to be moved to the face the players, resulting in many pieces of the game being disturbed. Alternatively, the game may be played with the information on the game board positioned upside down for some of the players.

Thus, it is an object of this invention to provide a means for individuals to learn the subject matter of a wide range of subject areas in an enjoyable and relaxed manner. More particularly, the present invention provides a means for individuals to learn about various subject areas in accordance with their academic needs.

It is a further object of this invention to enable individuals of differing age groups and skill levels to play simultaneously such that each player has a similar chance of winning the game.

It is a further object of this invention to permit the game to be played with ease by mounting the game board on a rotating drum, thereby allowing players to rotate the game board without disturbing the game pieces.

SUMMARY OF THE INVENTION

An educational game is provided, comprising a plurality of qualification cards for at least one subject, said qualification cards having a qualification question and a corresponding qualification answer; and a plurality of preparatory cards for at least one subject, said preparatory cards having a preparatory question and a corresponding preparatory answer wherein a player of the game, when presented with said qualification question and on providing said qualification answer, is presented with said preparatory question and on providing said preparatory answer, receives a score. A method for playing an educational game is provided, wherein a player's turn comprises receiving a qualification question; providing a qualification response to said qualification question; if said qualification response is the corresponding answer to said qualification question, receiving a preparatory question; providing a preparatory response to said preparatory question; and if said preparatory response is the corresponding answer to said preparatory question, receiving a score.

BRIEF DESCRIPTION OF FIGURES

Further objects, features and advantages of the present invention will become more readily apparent to those skilled in the art from the following description of the invention when taken in conjunction with the accompanying drawings, in which.

DETAILED DESCRIPTION OF PREFERRED EMBODIMENTS

Figure 1:
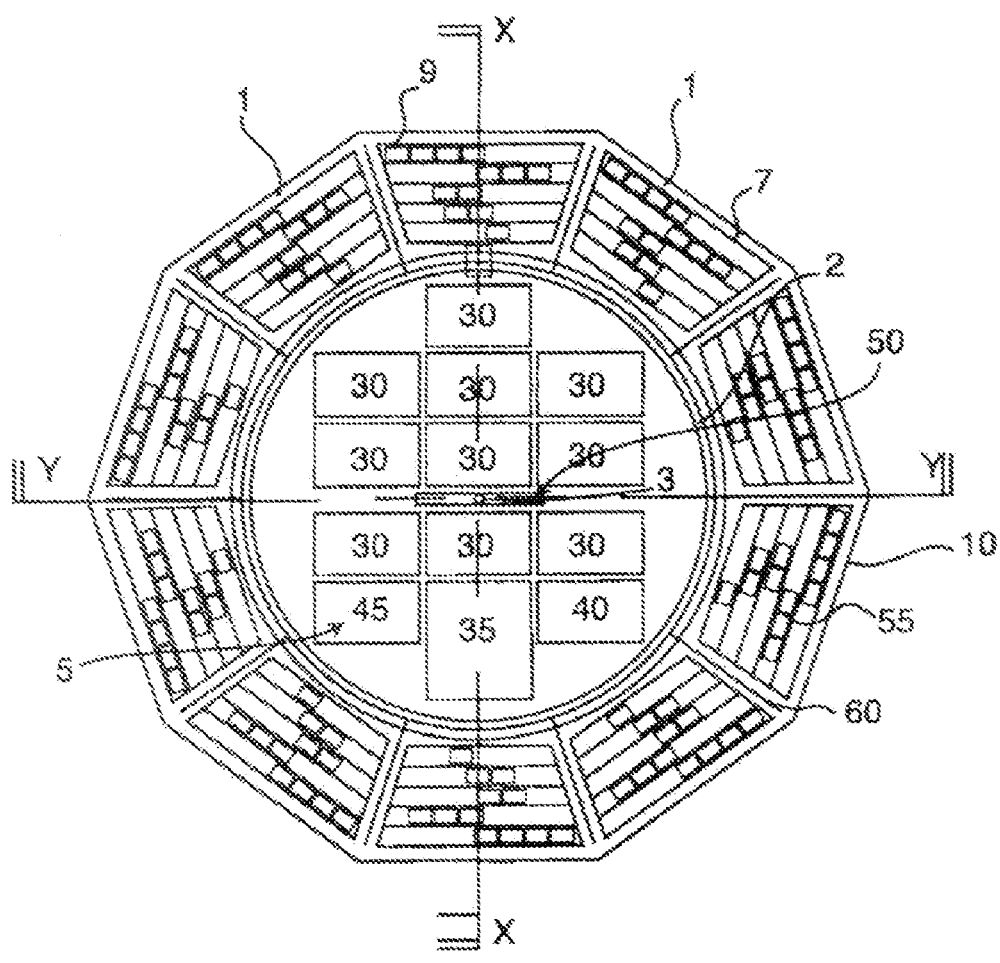
FIG. 1 is a top view of an embodiment of the game showing the stationary base and rotatable drum.
Figure 2:
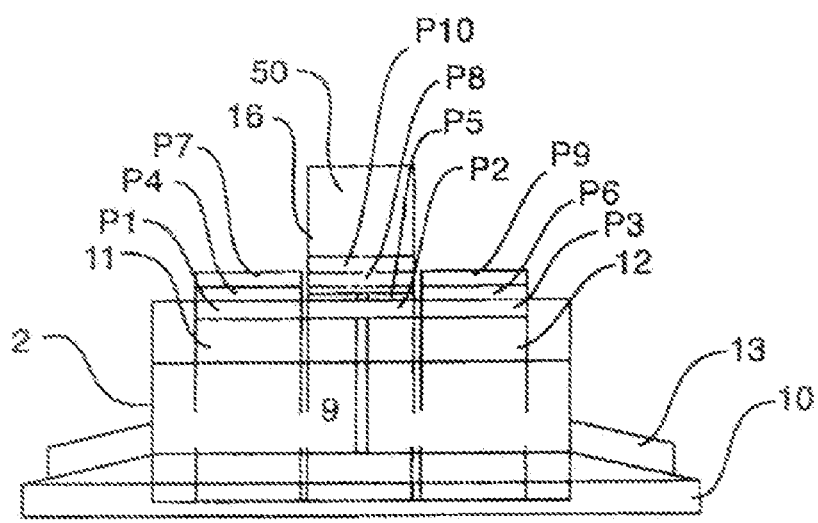
FIG. 2 is a cross sectional side view thereof taken along line Y-Y, showing the view from that of a player answering questions.
Figure 3:
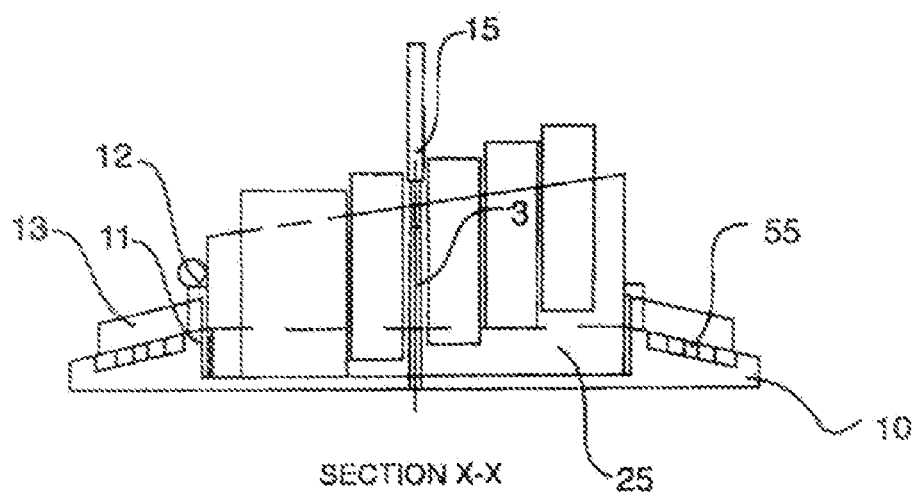
FIG. 3 is a cross sectional side view thereof taken along line X-X; showing the rotatable drum mounted via a pin onto the stationary base.
Figure 5:
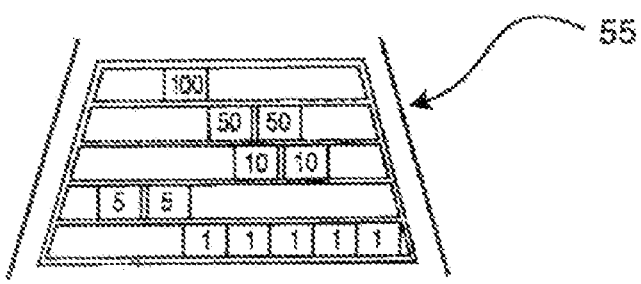
FIG. 5 is a view of a score register.

As illustrated in FIG. 2 and FIG. 3, educational game 1 includes stationary base 10, adapted to allow rotatable drum 15 to be mounted by means of a pin 9 positioned substantially at the center of stationary base 10. Storage area 25 positioned underneath rotatable drum 15 is adapted to store a plurality of preparatory cards and qualification cards. As best seen in FIG. 1, positioned on top of rotatable drum 15 are a plurality of preparatory cardholder slots 30, a qualification cardholder slot 35, a mascot holder slot 40, a score counter holder slot 45, and a single preparatory cardholder slot 50. On the perimeter of stationary base 10 are a plurality of elongated slots organized into score registers 55 adapted to hold score counters received by each player, as best seen in FIG. 5. A privacy barrier 60 separates score registers 55 of each player.

Stationary base 10 is made of any solid material such as wood or stiff cardboard. In the preferred embodiment, stationary base 10 is made of a lightweight plastic such as polyethylene terepthalate (PET) or polyvinyl chloride (PVC). Stationary base 10 can be any shape including rectangular or circular, but is preferably octagonal or hexagonal in shape.

A cavity at the center of stationary base 10 forms storage area 25. In the preferred embodiment, storage area 25 is circular in shape and is adapted to store a plurality of preparatory cards and qualification cards.

Figure 4:
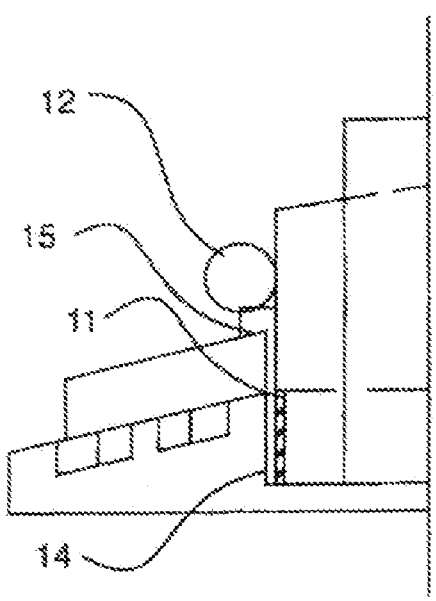
FIG. 4 is a detailed view of the of the mascot and metal strip used therein.

At the center of the cavity of stationary base 10 is a means for mounting rotatable drum 15 which will enable rotatable drum 15 to rotate. In the preferred embodiment, rotatable drum 15 is mounted by means of a pin type connection 9. Rotatable drum 15 can be made of any solid material including wood or stiff cardboard, but is typically made of the same material as stationary base 10. Rotatable drum 15 allows all players to face the game without having to move the game. On each turn by a player, a player turns rotatable drum 15 in a clockwise or counterclockwise direction so that rotatable drum 15 faces the next player. The position of each player is determined by means of a magnet 14 inserted in a slot 13 on stationary base 10, as best seen in FIG. 4. In the preferred embodiment, each player selects one of ten mascots 12, each having a magnet 14 as its base. A metallic strip 11 attached to rotatable drum 15 is biased towards the magnet 14 at the base of a mascot 12 inserted in a slot on stationary base 10 and rotatable drum 15 temporarily stops rotating. Rotatable drum 15 therefore can be successively rotated to the next player and may come to a rest when the metallic strip 11 approaches the next magnetic base of a mascot 12.

Preparatory cardholders 30, qualification cardholder 35, mascot holder 40, score counter holder 45, and single preparatory card holder 50 are made of any solid material, preferably plastic. These are supported on rotatable drum 15 by any means for fixing an attachment. In the preferred embodiment, there are a total of 10 preparatory cardholders 30, designated as P1 to P10, positioned on top of rotatable drum 15. Single preparatory cardholder 50 has a window 16 on its first side to display the answer to the questions on the other side of the card to the other players, and has two windows on the side facing the active player, one to display the preparatory question, and the other to display the choice of answers to the preparatory question.

Score counters are preferably cubes, although shapes are equally effective, and are made from a hard plastic. Each score counter is pre-assigned a value, typically, 1, 5, 10, 50 and 100, with the value displayed on a face of the cube. Thus, if a player has five counters with a value of one, that player may replace the five counters with a single counter with a value of 5. Preferably, the score counters are colored. Table 1 below indicates suggested colors to be used for the score counters, although a plurality of colors may be used according to the game designer preference.

TABLE 1

SUGGESTED COLORS FOR THE SCORE COUNTERS

| | SCORE COUNTER | | | | |
|---|---|---|---|---|---|
| | 1 | 5 | 10 | 20 | 50 |
| SUGGESTED COLOR | YELLOW | RED | BLUE | GREEN | WHITE |

Qualification Cards

Figure 6:
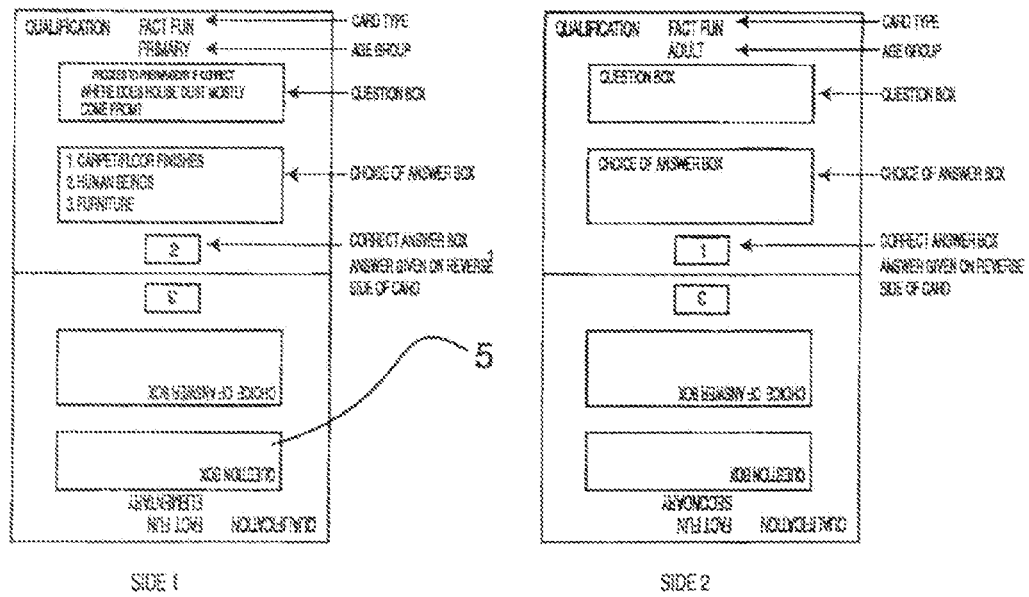
FIG. 6 is a view of each side of an embodiment of a qualification card.
Figure 7:
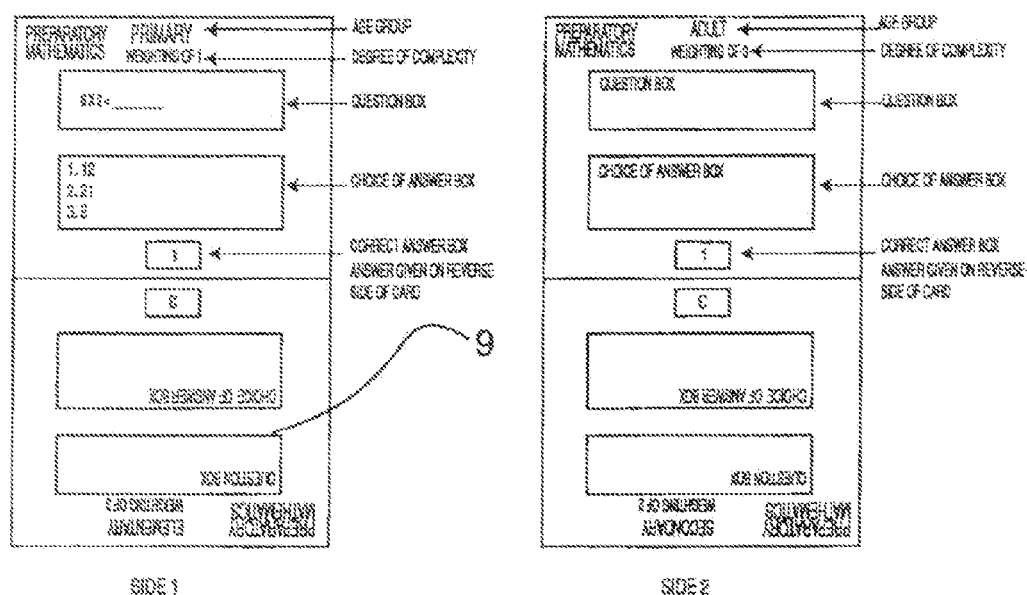
FIG. 7 is a view of each side of an embodiment of a preparatory card.

The plurality of qualification questions for various skill levels are preferably structured to parallel examination-type questions in subjects such as mathematics, geography, history, etc. The qualification questions on the qualification cards are designed to be of a type and style that will allow the players to gain knowledge in that subject matter. As best seen in FIG. 6, the qualification cards are comprised of a qualification question for each age group, a set of possible answers, and a corresponding qualification answer for each question. Table 2 below sets out examples of eight different types of qualification cards, which are randomly mixed and drawn from the complete set of qualification cards. Table 2 illustrates typical qualification questions by way of example only. The game will have a plurality of qualification card types and plurality of qualification questions. In the preferred embodiment, there will be eight different qualification card types randomly selected from the complete set of qualification cards. Other qualification card types can be introduced to the game. The number of cards in each qualification card type may be altered.

TABLE 2

EXAMPLES OF DIFFERING QUALIFICATION CARDS

| CARD TYPE | BASIC DESCRIPTION | EXAMPLE OF THE CARD TYPE | NUMBER OF CARDS |
|---|---|---|---|
| TYPE 1 | Preventative Cards | You have taken sick. Miss a turn. | 25 |
| TYPE 2 | Subject Chooser | Answer a physics question. | 200 |
| TYPE 3 | Fact Fun | Where does house dust mostly come from? a) carpet/floor finishes b) humans c) furniture Answer: a | 75 |
| TYPE 4 | Languages | The word GARCON in means a) boy b) girl c) man Answer: a | 75 |
| TYPE 5 | Mathematics | $(15 - 5) \times 8 - 5 =$ _____ Answer: 75 | 75 |
| TYPE 6 | General Knowledge | How many faces does a tetrahedron have? a) 3 b) 4 c) 5 d) 6 Answer: b | 75 |
| TYPE 7 | Science | Cytology is the study of: a) fossils b) cells c) animals Answer: b | 75 |
| TYPE 8 | Computer Technology | What is a byte? The storage space allocated to one character. True or False Answer: True | 75 |

The qualification cards are comprised of four qualification questions, one for each age group. In the preferred embodiment, there are four age groups namely elementary, primary, secondary, and adult. Each of the age group qualification questions has a background color that represents each age group. For example, purple color may signify the elementary age group. The qualification question, if answered correctly allows the player to proceed to the preparatory questions.

The qualification cards are seen as a way of limiting the individuals from answering the preparatory questions. The qualification cards introduce an element of surprise in the game and thus make the game interesting to play, with the preparatory cards making it educational and assist in preparing the player for an examination. Not all of the qualification cards need include questions as illustrated above. Furthermore, besides educational subject matter, qualification cards may include questions on a wide variety of topics such as sports and entertainment.

Preparatory Cards

The subject areas for the preparatory cards are subjects normally taken at school, college, or other educational institutions. For example, in a high school, there may be ten key subjects, namely Mathematics; English; Geography; Physics; Chemistry; Biology, Computer Science; History, Religious Studies and General Knowledge. For college or university level, the subjects can range from those appropriate for dentistry assistant training, legal secretary training, and library sciences. The subjects are adaptable for any program of study, and for less educational topics such as sports and entertainment.

The subject matter and form of the preparatory questions are of a type and form that are similar to examination questions. Such forms of questions include multiple choices, "yes or no" type, "true or false" type, graphical type, selection of phrases, and mathematical representations.

The plurality of preparatory cards are divided into subject groups. In the preferred embodiment, the preparatory cards are divided into ten major subject groups. The plurality of preparatory questions in each subject group are further divided into age groups so that a player in that age group will be awarded the same points as those of the other age groups if the preparatory question is answered correctly. In the preferred embodiment, there are four age groups namely, elementary, primary, secondary, and adult. Each of the age group questions has a background color that represents that age group in the game. The preparatory cards are comprised of four preparatory questions, one for each age group. Each preparatory question is assigned a score according to the degree of complexity. Typically, a basic question in any age group will be assigned a score of "1", an intermediate level question will be assigned a score of "2", and an advanced level question will be assigned a score of "3". By introducing differing levels of complexity in the question, the game exposes the individuals to both lower and higher knowledge levels for that individual, and is educated accordingly. The levels may be selected prior to the active player receiving the preparatory question, or in alternative embodiments, the active player may view all three questions and select one to answer. Alternatively, the qualification card may determine which level to answer.

In an alternative embodiment, the preparatory cards may be modified for advanced players by creating a set of preparatory cards for specialized subject groups. For example, the game may be played at the University level for a specialized subject area such as Civil engineering. The preparatory cards can cover a complete range of subject groups.

Table 3 illustrates typical preparatory questions in the area of mathematics for different age groups in varying degrees of complexity.

TABLE 3

EXAMPLE OF MATHEMATICS QUESTION BY AGE GROUP/DEGREE OF COMPLEXITY

| | DEGREE OF COMPLEXITY | | |
|---|---|---|---|
| AGE GROUP | BASIC Score = 1 | INTERMEDIATE Score = 2 | ADVANCED Score = 3 |
| Elementary | $2 + 2 = \_\_\_$ answer: 4 | $2 + 2 + 6 = \_\_\_$ answer: 10 | $2 + 3 - 2 = \_\_\_$ answer: 3 |
| Primary | $6 \times 2 = \_\_\_$ answer: 12 | $2 \times 2 \times 6 = \_\_\_$ answer: 24 | $(2 + 3) \times 3 = \_\_\_$ answer: 15 |
| Secondary | $12 \times 8/3 = \_\_\_$ answer: 32 | $(12 \times 9/2)/2 = \_\_\_$ answer: 27 | $(12 \times 9/2)/(6 \times 3) = \_\_\_$ answer: 3 |
| Adult | $(12 \times 8/3) \times \frac{1}{2} = \_\_\_$ answer: 16 | $(12 \times 9/2)/(3 \times 2) = \_\_\_$ answer: 9 | $(12 \times 9/3) \times (5 \times 3) = \_\_\_$ answer: 540 |

Method of Playing the Game

The roll of the dice is taken by each of the players and the one with the highest score begins the game. If two or more players have the same score, the process of rolling the dice is repeated for these players until the players with the least score are eliminated.

The length of the game is decided by predetermining a winning score. In the preferred embodiment, the minimum wining score is two hundred points and the maximum score is nine hundred points. Mascots are chosen by the players from the storage box and inserted in the player's position. The players select a set of preparatory cards based on the subject area of choice. The selected set of preparatory cards are placed in the plurality of preparatory cardholders 30 adapted to hold a plurality of sets of preparatory cards positioned on rotating drum 15.

Any player who cheats in the game and is caught is eliminated from the game and cannot play again in the game. When the player answers the questions, others in the game should be silent so as not to disturb the concentration of the active player. Talking is permitted in between the successive selections or during the answering of the qualification cards, but not during the answering of the preparatory cards.

The qualification cards are designed to permit certain luck of the draw events to take place to make the game more interesting to play. Therefore, before selecting a preparatory card, a qualification card is selected. The qualification question on the qualification card must be answered correctly in order to proceed to the preparatory question. Alternatively, the qualification card imposes some condition that must be met prior to continuing with the game. For example, they player may miss a turn, or be imposed with some other form of condition that must be followed, or be given the opportunity to answer a particular type of qualification questions.

If the player gives the corresponding qualification answer to the qualification question, a preparatory question is selected and placed in single preparatory cardholder slot 50 so that all the non-active players can view the answer on the back of preparatory card. There are several ways in which the subject matter of the preparatory card can be determined. In a preferred embodiment the active player can select the subject. In an alternative embodiment, the qualification card will determine the subject matter. In yet other embodiments, each player will only be allowed to obtain a predetermined number of points from each subject, thus requiring the winning player to have a broad knowledge in many of the different subjects.

If the active player gives the corresponding preparatory answer to the preparatory question, the player receives a score. The number of points awarded is determined by multiplying the score with the roll of a dice. For example, if a "3" is rolled on the dice, and the score received is "3", then the points gained in answering the preparatory question correctly is "9". Then nine score counters are picked-up and placed on the score register. Other means of determining the points are also available, such as using the f course The game will terminate when the winning score is achieved as previously decided at the beginning of the game. In one embodiment, a certificate that is a high quality and well-designed document which has empty slots, is completed by a player, and presented to the declared winner of the game. This certificate can be displayed on the wall to encourage the younger players in the game to do well next time. Older players may simply walk away with the satisfaction of winning the game.

While the principles of the invention have now been made clear in the illustrated embodiments, it will be immediately obvious to those skilled in the art that many modifications may be made of structure, arrangements, and algorithms used in the practice of the invention, and otherwise, which are particularly adapted for specific environments and operational requirements, without departing from those principles. The claims are therefore intended to cover and embrace such modifications within the limits only of the true spirit and scope of the invention.

What is claimed is:

1. A game system for a first player and a second player, comprising:
   (a) a base;
   (b) a rotatable drum mounted to said base; said rotatable drum having a metallic strip on its perimeter; and
   (c) first and second magnetic mascot for each of said first and second players positionable on said base within first and second slots, respectively, said first and second slots outside of said perimeter;

wherein on rotation of said rotatable drum from a position facing said first slot to a position facing said second slot, said metallic strip is biased to said magnetic mascot within said second slot.

2. The game system of claim 1 wherein said drum includes a slot for storing a plurality of cards.

3. The game of claim 2 wherein said plurality of cards, when not in use, are storable within said stationary base below said rotatable drum.

4. The game system of claim 3 wherein said rotatable drum is mounted to said base by a pin type connection.

\* \* \* \* \*